US006648807B2

(12) United States Patent
Hashimoto et al.

(10) Patent No.: US 6,648,807 B2
(45) Date of Patent: Nov. 18, 2003

(54) CONDUCTIVE RUBBER ROLLER

(75) Inventors: Masayuki Hashimoto, Chiba (JP); Masayuki Takahashi, Ibaraki (JP); Mitsuru Okuda, Ibaraki (JP)

(73) Assignee: Canon Kasei Kabushiki Kaisha, Ibaraki-ken (JP)

( * ) Notice: Subject to any disclaimer, the term of this patent is extended or adjusted under 35 U.S.C. 154(b) by 14 days.

(21) Appl. No.: 10/013,464

(22) Filed: Dec. 13, 2001

(65) Prior Publication Data

US 2002/0128139 A1 Sep. 12, 2002

(30) Foreign Application Priority Data

Dec. 18, 2000 (JP) ...................................... 2000-383923

(51) Int. Cl.[7] ................................................ B23P 15/00
(52) U.S. Cl. ........................................... 492/59; 492/56
(58) Field of Search ..................... 492/56, 59; 399/176, 399/174; 524/495, 496, 191; 252/511; 428/36.5, 220, 457, 462

(56) References Cited

U.S. PATENT DOCUMENTS

| | | | | |
|---|---|---|---|---|
| 4,777,512 A | | 10/1988 | Takahashi et al. | 355/14 D |
| 5,565,968 A | * | 10/1996 | Sawa et al. | 399/286 |
| 5,604,031 A | * | 2/1997 | Yamamoto et al. | 428/335 |
| 5,608,503 A | * | 3/1997 | Fujiwara et al. | 399/302 |
| 5,733,235 A | | 3/1998 | Waku et al. | 492/25 |
| 5,863,626 A | * | 1/1999 | Yamasaki | 428/36.5 |
| 5,978,639 A | * | 11/1999 | Masuda et al. | 399/302 |
| 6,078,773 A | * | 6/2000 | Shimojo et al. | 399/302 |
| 6,144,830 A | * | 11/2000 | Kusaba et al. | 399/302 |
| 6,243,552 B1 | * | 6/2001 | Murata | 399/176 |
| 6,420,012 B1 | * | 7/2002 | Takagi et al. | 428/141 |
| 6,458,883 B1 | * | 10/2002 | Takashima et al. | 524/495 |

FOREIGN PATENT DOCUMENTS

| | | |
|---|---|---|
| JP | 8-292640 | 5/1996 |
| JP | 11-65269 | 3/1999 |

* cited by examiner

*Primary Examiner*—I Cuda Rosenbaum
(74) *Attorney, Agent, or Firm*—Fitzpatrick, Cella, Harper & Scinto

(57) ABSTRACT

In a conductive rubber roller including a conductive support and a rubber layer, the rubber layer includes a component (A), an epichlorohydrin rubber containing 40 mol % or more of ethylene oxide, and a component (B), an acrylonitrile butadiene rubber component having an acrylonitrile content of 20% by weight or less. The component (A) is in a proportion of 5 or more to less than 25 in weight ratio, based on a total weight of the components (A) and (B).

9 Claims, No Drawings

CONDUCTIVE RUBBER ROLLER

BACKGROUND OF THE INVENTION

Field of the Invention

This invention relates to a conductive rubber roller used in an image-forming apparatus, such as electrophotographic copying machines, electrophotographic printers, and electrostatic recording apparatus, wherein the conductive rubber roller is disposed in contact with an electrophotographic photosensitive member.

In the image-forming apparatus, such as electrophotographic copying machines, electrophotographic printers, and electrostatic recording apparatus, a toner used as a developer is made to adhere to an electrostatic latent image formed by exposing an electrophotographic photosensitive member, which has been electrostatically, uniformly charged, and then the toner (toner image) is transferred to a transfer medium such as paper to form an image. Also, methods for charging the electrophotographic photosensitive member include a noncontact charging method utilizing corona discharge and a contact charging method making use of a conductive roller. Transfer methods also similarly include a noncontact corona transfer method and a contact roller transfer method.

In the conductive roller, a conductive rubber material having an electrical resistance of from $1\times10^5$ to $1\times10^{11}$ Ω·cm as volume resistivity is used. Such a conductive rubber material is compounded with a conductive filler such as carbon black in order to achieve the intended conductivity. In the conductive rubber material thus obtained, however, its electrical resistance is influenced by changes in the applied voltage, and hence an applied-voltage control unit must be provided when used as a charging member. Also, such a conductive rubber material may have non-uniform resistance value depending on how the conductive filler stands dispersed in the rubber material, and it has been difficult to obtain rubber materials having stable electrical resistance.

As a means for solving such a problem, a method is known in which a conductive rubber which is a polymer having a low electrical resistance is used for a rubber component used as a charging member to attain a stated electrical resistance. The conductivity of such a conductive rubber material does not rely on a conductive filler, such as carbon black. Hence, it has a small variation in electrical resistance depending on material lots or a small dependence on the applied voltage, and is a material, which is very easy to handle. It, however, has a disadvantage that it has a great difference in electrical resistance between a low-temperature, low-humidity environment and a high-temperature, high-humidity environment, in other words, a high environmental dependence.

Because of an advantage of a relatively small variation of electrical resistance, conductive rubbers, such as an acrylonitrile butadiene rubber and an epichlorohydrin rubber are used as materials for conductive rollers. Of these materials, the acrylonitrile butadiene rubber has a low resistivity of from $1\times10^9$ to $10^{10}$ Ω·cm and is inexpensive. Accordingly, it is in wide use as a material for conductive rollers, in particular, as a material for transfer rollers.

However, for reasons of making machinery compact and achieving cost reduction, power sources for applying electric charges to transfer rollers are also made compact, and have come to be of a type to which a great voltage cannot be applied. Accordingly, the rubber materials are also demanded to be those having a volume resistivity of from $1\times10^8$ Ω·cm to $1\times10^9$ Ω·cm, which is lower by about one figure than ever, and also those having a low environmental dependence.

An acrylonitrile butadiene rubber is commonly used in an acrylonitrile content ranging between 15% by weight and 50% by weight. However, in the case when the acrylonitrile content is in such a proportion, the electrical resistance is not so greatly variable, and the electrical resistance can only be regulated by a small amount.

As a method of regulating its electrical resistance, carbon black may be added. The addition of carbon black, however, is not preferable because it tends to cause a variation in electrical resistance.

Methods are also proposed in which an acrylonitrile butadiene rubber is blended with an epichlorohydrin rubber, which is also conductive-rubber. The epichlorohydrin rubber includes a homopolymer of epichiorohydrin and its copolymer with ethylene oxide. The product obtained by copolymerization with ethylene oxide has a lower electrical resistance because ethylene oxide is in a higher content in its composition. In proposals using a blend with an epichiorohydrin rubber, a blend proportion of the epichlorohydrin rubber is 25 parts or more based on 100 parts of the total weight, which is so high as to result in a great environmental dependence (Japanese Patent Application Laid-Open No. 8-292640) or, since a blend having a low ethylene oxide content of 40 mol % or less, i.e., one having a high electrical resistance is used, the electrical resistance can be regulated to be in a narrow range (Japanese Patent Application Laid-Open No. 11-65269), either of which is not preferable in the sense that the electrical resistance should be regulated to be at a low-resistance side, which is lower by about one figure.

SUMMARY OF THE INVENTION

An object of the present invention is to provide a conductive rubber roller which can solve the above problems, having a low environment dependence of electrical resistance and a small scattering of electrical resistance.

To achieve the above object, the present invention provides a conductive rubber roller comprising a conductive support and a rubber layer;

- the rubber layer comprising a component (A), an epichlorohydrin rubber containing 40 mol % or more of ethylene oxide and a component (B), an acrylonitrile butadiene rubber component having an acrylonitrile content of 20% by weight or less.
- the component (A) being in a proportion of 5 or more to less than 25 in weight ratio, based on the total weight of the components (A) and (B).

DETAILED DESCRIPTION OF THE INVENTION

The present inventors have taken note of the fact that the electrical resistance of an epichlorohydrin rubber changes depending on an ethylene oxide content in the epichlorohydrin rubber and the electrical resistance decreases with an increase in the ethylene oxide content. They have considered that, an acrylonitrile butadiene rubber having a small environmental dependence should be blended with a small quantity of an epichlorohydrin rubber, in particular, one having a large ethylene oxide content, i.e., one having a low electrical resistance, whereby the resultant blend could be made to have a low electrical resistance while keeping small the environmental dependence of acrylonitrile butadiene rubber.

The conductive rubber roller of the present invention is described below in detail.

The conductive rubber roller of the present invention consists basically of a conductive support and a rubber layer.

As the conductive support used, any support may be used as long as it is electrically conductive and can withstand the load applied to the roller, such as rotation. Commonly used is a roller comprised of a metal such as iron or stainless steel, or any of these which has been plated.

Rubber components used in the present invention are an acrylonitrile butadiene rubber and an epichlorohydrin rubber. The acrylonitrile butadiene rubber and the epichlorohydrin rubber are highly compatible with each other, and become uniformly mixed when blended. As a result, the blended mix can be a rubber material having a small variation in electrical resistance.

The component (B), acrylonitrile butadiene rubber, is one having an acrylonitrile content of 20% by weight or less, and may preferably be one having an acrylonitrile content of 18% or less, and preferably 10% by weight or more as the lower limit. If the acrylonitrile butadiene rubber has an acrylonitrile content more than 20% by weight, it may have a high environmental dependence. If on the other hand the acrylonitrile butadiene rubber has an acrylonitrile content less than 10% by weight, it tends to have a high electrical resistance.

The component (A), epichlorohydrin rubber, is one having an ethylene oxide content of 40 mol % or more, and may preferably be one having an ethylene oxide content of 48 mol % or more, and preferably 65 mol % or less as the upper limit. This ethylene oxide content may be an ethylene oxide content, which is 40 mol % or more in the polymer composition, or may be so regulated by blending a plurality of epichlorohydrin rubbers having different ethylene oxide contents. The electrical resistance of the epichlorohydrin rubber becomes lower with an increase in the ethylene oxide content. If an epichlorohydrin rubber having an ethylene oxide content less than 40 mol % is used, the epichlorohydrin rubber must be blended in a large quantity in the acrylonitrile butadiene rubber used to attain a stated electrical resistance, resulting in a high environmental dependence. If on the other hand one having an ethylene oxide content more than 65 mol % is used, the ethylene oxide tends to crystallize to make the blend have both high electrical resistance and high environmental dependence.

The component (A) is in a proportion of 5 or more to less than 25, and preferably from 10 to 20, in weight ratio, based on the total weight of the components (A) and (B); the proportion being the value obtained by dividing the amount of component (A) by the total sum of those of the components (A) and (B), and multiplying the resultant value by 100 [(A)/{(A)+(B)×100]. If the epichlorohydrin rubber is present in an amount, which is less than this proportion, a reduced effect of lowering electrical resistance may be obtained. If it is more than that, a high environmental dependence may result.

In the present invention, the conductive rubber material is obtained by adding additives to the rubbers exemplified above, and dispersing them by kneading, followed by heating at 160 to 180° C. for 10 to 50 minutes to effect vulcanization. As the additives, usable are conventionally known additives such as a vulcanizing agent, a vulcanizing accelerator, a softening agent, a plasticizer, a reinforcing agent, a filler and a blowing agent.

The conductive rubber roller of the present invention is commonly produced by extruding the above-mentioned conductive rubber material in a tubular shape, which is then subjected to vapor vulcanization, and thereafter a conductive support is press-fitted to the tubular product, followed by grinding to have a stated outer diameter. Various methods known conventionally may also be used, such as simultaneous extrusion together with the support and press vulcanization. The conductive rubber roller of the present invention may also be provided with a layer of resin or the like on a periphery of the rubber layer.

The rubber material used in the conductive rubber roller of the present invention may preferably have an electrical resistance of $1\times10^8$ Ω·cm or below, and particularly $1\times10^8$ Ω·cm or above, as a calculated volume resistivity in an environment of 23° C./55% RH (N/N). Also, the conductive rubber roller of the present invention may preferably have an electrical resistance of $2\times10^8$ Ω or below, and particularly $1\times10^7$ Ω or above, as a resistance in an environment of 23° C./55% RH (N/N).

The present invention is described below in greater detail by giving more specific constructions as Examples. The present invention is by no means limited to the scope exemplified below.

Production of Rubber Material

EXAMPLES 1 TO 12 & COMPARATIVE EXAMPLES 1 TO 7

The components shown in Tables 1 and 2 were compounded and kneaded so as to be used as the rubber material.

In the foregoing Examples and Comparative Examples, as the acrylonitrile butadiene rubber (NBR) noted by (*1), DN401, available from Nippon Zeon Co., Ltd., was used; as the one noted by (*2), DN407, available from Nippon Zeon Co., Ltd.; as the one noted by (*3), N260S, available from JSR Corporation; as the epichlorohydrin rubbers noted by (*4) and (*6), Gechron 3106 and Gechron 3105 (trade names), respectively, available from Nippon Zeon Co., Ltd.; and as the epichlorohydrin rubber noted by (*5), CG-105, available from Daiso K.K.

As the zinc oxide, two types of zinc oxide available from Hakusul Tekku K.K. were used; as the stearic acid, Lunac S20 (trade name), available from Kao Corporation; as the FT carbon black, #15, available from Asahi Carbon Co., Ltd.; as the calcium bicarbonate, Super SS (trade name), available from Maruo Calcium Corporation; as the dibenzothiazyldisulfide (MBTS), Nocceler DM (trade name), available from Ohuchi-Shinko Chemical Industrial Co., Ltd.; as the tetraethylthiuram disulfide (TETD), Nocceler TET (trade name), available from Ohuchi-Shinko Chemical Industrial Co., Ltd.; and as the sulfur, Sulfax PMC (trade name), available from Tsurumi Kagaku Kogyo K.K.

Performance Evaluation of Rubber Material

Using the rubber materials of the above Examples and Comparative Examples, rubber vulcanized sheets were prepared to evaluate their electrical resistance.

First, polymers and chemicals were kneaded under the formulation in each Example and Comparative Example, and the kneaded product obtained was subjected to pressure vulcanization at 160° C. for 30 minutes to obtain test pieces of rubber vulcanized sheets with 120 mm of longitudinal and horizontal×2 mm of width.

To the test pieces thus obtained, a DC voltage of 500 V was applied to measure their volume resistivity in each of low temperature/low humidity environment of 10°

C./15%RH (L/L), normal temperature/normal humidity environment of 23° C./55%RH (N/N) and high temperature/high humidity environment of 35° C./95%RH (H/H). The measured volume resistivity in L/L was divided by the volume resistivity in H/H, and the value obtained was logarithmically changed to find a variation figure. In the present Examples and Comparative Examples, samples whose volume resistivity was in a variation figure of 1.0 or smaller was evaluated as preferable ones.

The results of the above evaluation are shown in Tables 3 and 4.

Performance Evaluation of Rubber Roller

Production of rubber roller:

Rubber rollers were produced using the rubber materials of the above Examples and Comparative Examples to evaluate their electrical resistance. Polymers and chemicals were kneaded under the formulation in each Example and Comparative Example to prepare rubber materials, which were then extruded in a tubular form by means of an extruder, followed by vapor vulcanization at 160° C. for 30 minutes to obtain rubber vulcanized products. To the tubular vulcanized products thus obtained, conductive supports of 6 mm in diameter were press-fitted to form rollers, followed by grinding to have a diameter of 15 mm. Thus, conductive rubber rollers were produced.

Measurement of electrical resistance:

Each conductive rubber roller thus produced was brought into pressure contact with a stainless-steel drum of 30 mm in outer diameter in such a way that a load of 500 g each was applied to the both end sides of the conductive support of the conductive rubber roller, in the state of which a voltage of 2,000 V was applied across the conductive support and the stainless-steel drum to measure electric-current value in each of environment of 10° C./15% RH (L/L), environment of 23° C./55% RH (N/N) and environment of 35° C./95% RH (H/H), and the resistance was calculated according to Ohm's law. The measured resistance in L/L was divided by the resistance in H/H, and the value obtained was logarithmically changed to find a variation figure. In the present Examples and Comparative Examples, rollers whose resistance was in a variation figure of 1.0 or smaller was evaluated as preferable ones like the case of the rubber material.

Image Evaluation:

The conductive rubber rollers thus obtained were each used as a transfer roller of a laser beam printer (Laser Jet 4050, manufactured by Hewlett-Packard Co.), and halftone images were printed in the same two environments of L/L and H/H as those for the above measurement of resistance. Image quality was visually evaluated.

The results of the evaluation are shown in Tables 5 and 6. In the tables, "A" indicates that good images were formed; and "B", faulty images caused by uneven transfer or insufficient transfer were formed.

As can be seen from Examples 1 to 12 and Comparative Examples 1 to 3, the proportion of the epichlorohydrin rubber to the acrylonitrile butadiene rubber is suitable when it is within the range of the present invention. When the epichlorohydrin rubber is less than the lower limit of the range specified in the present invention as in the case of Comparative Examples 1 and 2, the transfer rollers have a high volume resistivity in every environment, and cause uneven transfer in L/L. When the epichlorohydrin rubber is more than the upper limit of the range specified in the present invention as in the case of Comparative Example 3, the environmental dependency becomes high and the transfer roller causes insufficint transfer in H/H.

As also can be seen from Examples 1 to 12 and Comparative Examples 4 and 5, the acrylonitrile content is suitable when it is within the range of the present invention. When the acrylonitrile content is 22% by weight, which is more than 20% by weight, as in the case of Comparative Examples 4 and 5, the transfer rollers have a high environmental dependence. When the epichlorohydrin rubber is in a small quantity (Comparative Example 4), the transfer roller has a high electrical resistance in L/L to cause uneven transfer. When the epichlorohydrin rubber is in a large quantity (Comparative Example 5), the transfer roller has a low electrical resistance in H/H to cause insufficient transfer.

As still also can be seen from Examples 1 to 5 and 9 to 12 and Comparative Examples 6 and 7, the ethylene oxide content in the epichlorohydrin rubber is suitable when it is within the range of the present invention. When it is 38 mol %, which is less than 40 mol %, the effect of achieving low electrical resistance that is attributable to the blending is so small as to provide a high electrical resistance in L/L to cause uneven transfer.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| NBR (*1): | 95 | 90 | 85 | 80 | — | — | — | — | 95 | 90 | 85 | 80 |
| NBR (*2): | — | — | — | — | 95 | 90 | 85 | 80 | — | — | — | — |
| Epichlroro-hydrin rubber (*4): | 5 | 10 | 15 | 20 | 5 | 10 | 15 | 20 | — | — | — | — |
| Epichlroro-hydrin rubber (*5): | — | — | — | — | — | — | — | — | 5 | 10 | 15 | 20 |
| Stearic acid: | 1 | 1 | 1 | 1 | 1 | 1 | 1 | 1 | 1 | 1 | 1 | 1 |
| Zinc oxide, two types: | 5 | 5 | 5 | 5 | 5 | 5 | 5 | 5 | 5 | 5 | 5 | 5 |
| FT carbon black: | 20 | 20 | 20 | 20 | 20 | 20 | 20 | 20 | 20 | 20 | 20 | 20 |
| Calcium bicarbonate: | 30 | 30 | 30 | 30 | 30 | 30 | 30 | 30 | 30 | 30 | 30 | 30 |
| MBTS: | 1.5 | 1.5 | 1.5 | 1.5 | 1.5 | 1.5 | 1.5 | 1.5 | 1.5 | 1.5 | 1.5 | 1.5 |

TABLE 1-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| TETD: | 1.5 | 1.5 | 1.5 | 1.5 | 1.5 | 1.5 | 1.5 | 1.5 | 1.5 | 1.5 | 1.5 | 1.5 |
| Sulfur: | 0.5 | 0.5 | 0.5 | 0.5 | 0.5 | 0.5 | 0.5 | 0.5 | 0.5 | 0.5 | 0.5 | 0.5 |

*1 Acrylonitrile content: 18% by weight
*2 Acrylonitrile content: 15% by weight
*3 Ethylene oxide content: 56 mol %
*4 Ethylene oxide content: 48 mol %

TABLE 2

| | Comparative Example | | | | | | |
|---|---|---|---|---|---|---|---|
| | 1 | 2 | 3 | 4 | 5 | 6 | 7 |
| NBR (*1): | 100 | 97 | 70 | — | — | 95 | 80 |
| NBR (*3): | — | — | — | 95 | 80 | — | — |
| Epichlroro-hydrin rubber (*4): | — | 3 | 30 | 5 | 20 | — | — |
| Epichlroro-hydrin rubber (*6): | — | — | — | — | — | 5 | 20 |
| Stearic acid: | 1 | 1 | 1 | 1 | 1 | 1 | 1 |
| Zinc oxide, two types: | 5 | 5 | 5 | 5 | 5 | 5 | 5 |
| FT carbon black: | 20 | 20 | 20 | 20 | 20 | 20 | 20 |
| Calcium bicarbonate: | 30 | 30 | 30 | 30 | 30 | 30 | 30 |

TABLE 2-continued

| | Comparative Example | | | | | | |
|---|---|---|---|---|---|---|---|
| | 1 | 2 | 3 | 4 | 5 | 6 | 7 |
| MBTS: | 1.5 | 1.5 | 1.5 | 1.5 | 1.5 | 1.5 | 1.5 |
| TETD: | 1.5 | 1.5 | 1.5 | 1.5 | 1.5 | 1.5 | 1.5 |
| Sulfur: | 0.5 | 0.5 | 0.5 | 0.5 | 0.5 | 0.5 | 0.5 |

*1 Acrylonitrile content: 18% by weight
*3 Acrylonitrile content: 22% by weight
*4 Ethylene oxide content: 56 mol %
*6 Ethylene oxide content: 38 mol %

TABLE 3

| | Example | | | | | |
|---|---|---|---|---|---|---|
| | 1 | 2 | 3 | 4 | 5 | 6 |
| Volume resistivity (Ω · cm): | | | | | | |
| 10° C./15% RH (L/L) | $2.0 \times 10^9$ | $9.8 \times 10^8$ | $9.4 \times 10^8$ | $9.0 \times 10^8$ | $3.2 \times 10^9$ | $2.5 \times 10^9$ |
| 23° C./55% RH (N/N) | $7.3 \times 10^8$ | $5.1 \times 10^8$ | $3.8 \times 10^8$ | $2.5 \times 10^8$ | $7.8 \times 10^8$ | $1.0 \times 10^9$ |
| 35° C./95% RH (H/H) | $3.7 \times 10^8$ | $1.3 \times 10^8$ | $9.9 \times 10^7$ | $9.2 \times 10^7$ | $5.8 \times 10^8$ | $4.0 \times 10^8$ |
| Variation figure: | 0.73 | 0.88 | 0.98 | 0.99 | 0.74 | 0.80 |
| | **Example** | | | | | |
| | 7 | 8 | 9 | 10 | 11 | 12 |
| Volume resistivity (Ω · cm): | | | | | | |
| 10° C./15% RH (L/L) | $2.0 \times 10^9$ | $9.8 \times 10^8$ | $3.6 \times 10^9$ | $2.8 \times 10^9$ | $2.3 \times 10^9$ | $1.8 \times 10^9$ |
| 23° C./55% RH (N/N) | $8.5 \times 10^8$ | $1.7 \times 10^8$ | $9.3 \times 10^8$ | $7.8 \times 10^8$ | $6.3 \times 10^8$ | $5.2 \times 10^8$ |
| 35° C./95% RH (H/H) | $2.8 \times 10^8$ | $9.8 \times 10^7$ | $5.7 \times 10^8$ | $4.0 \times 10^8$ | $3.1 \times 10^8$ | $2.3 \times 10^8$ |
| Variation figure: | 0.85 | 0.99 | 0.80 | 0.85 | 0.87 | 0.89 |

TABLE 4

| | Comparative Example | | | | | | |
|---|---|---|---|---|---|---|---|
| | 1 | 2 | 3 | 4 | 5 | 6 | 7 |
| Volume resistivity (Ω · cm) | | | | | | | |
| 10° C./15% RH (L/L) | $4.3 \times 10^9$ | $3.8 \times 10^9$ | $8.0 \times 10^8$ | $8.1 \times 10^9$ | $8.2 \times 10^8$ | $4.2 \times 10^9$ | $3.9 \times 10^9$ |
| 23° C./55% RH (L/L) | $3.5 \times 10^9$ | $2.3 \times 10^9$ | $1.2 \times 10^8$ | $5.0 \times 10^8$ | $1.2 \times 10^8$ | $2.8 \times 10^9$ | $1.0 \times 10^9$ |
| 35° C./95% RH (H/H) | $8.0 \times 10^8$ | $7.1 \times 10^8$ | $4.5 \times 10^7$ | $7.0 \times 10^8$ | $5.1 \times 10^7$ | $7.3 \times 10^8$ | $3.0 \times 10^8$ |
| Variation figure: | 0.73 | 0.73 | 1.25 | 1.06 | 1.21 | 0.76 | 1.11 |

TABLE 5

| | Example | | | | | |
|---|---|---|---|---|---|---|
| | 1 | 2 | 3 | 4 | 5 | 6 |
| Resistance (Ω): | | | | | | |
| 10° C/15% RH (L/L) | $5.0 \times 10^8$ | $4.3 \times 10^8$ | $2.5 \times 10^8$ | $1.8 \times 10^8$ | $7.1 \times 10^8$ | $4.8 \times 10^8$ |
| 23° C/55% RH (N/N) | $1.6 \times 10^8$ | $9.5 \times 10^7$ | $8.1 \times 10^7$ | $4.5 \times 10^7$ | $2.0 \times 10^8$ | $1.8 \times 10^8$ |
| 35° C/95% RH (H/H) | $9.3 \times 10^7$ | $6.0 \times 10^7$ | $2.7 \times 10^7$ | $1.8 \times 10^7$ | $1.2 \times 10^8$ | $6.5 \times 10^7$ |
| Variation figure: | 0.73 | 0.86 | 0.97 | 1.00 | 0.77 | 0.87 |
| L/L image evaluation: | A | A | A | A | A | A |
| H/H image evaluation: | A | A | A | A | A | A |
| | Example | | | | | |
| | 7 | 8 | 9 | 10 | 11 | 12 |
| Resistance (Ω): | | | | | | |
| 10° C/15% RH (L/L) | $4.4 \times 10^8$ | $1.7 \times 10^8$ | $9.0 \times 10^8$ | $7.3 \times 10^8$ | $6.2 \times 10^8$ | $4.3 \times 10^8$ |
| 23° C/55% RH (N/N) | $1.5 \times 10^8$ | $3.4 \times 10^7$ | $1.7 \times 10^8$ | $1.5 \times 10^8$ | $1.3 \times 10^8$ | $1.2 \times 10^8$ |
| 35° C/95% RH (H/H) | $5.6 \times 10^7$ | $1.9 \times 10^7$ | $1.3 \times 10^8$ | $9.2 \times 10^7$ | $7.6 \times 10^7$ | $5.1 \times 10^7$ |
| Variation figure: | 0.90 | 0.95 | 0.84 | 0.90 | 0.91 | 0.93 |
| L/L image evaluation: | A | A | A | A | A | A |
| H/H image evaluation: | A | A | A | A | A | A |

TABLE 6

| | Comparative Example | | | | | | |
|---|---|---|---|---|---|---|---|
| | 1 | 2 | 3 | 4 | 5 | 6 | 7 |
| Resistance (Ω): | | | | | | | |
| 10° C/15% RH (L/L) | $1.0 \times 10^9$ | $1.5 \times 10^9$ | $1.1 \times 10^8$ | $2.5 \times 10^8$ | $9.1 \times 10^7$ | $2.3 \times 10^9$ | $1.8 \times 10^9$ |
| 23° C/55% RH (N/N) | $8.1 \times 10^8$ | $5.3 \times 10^8$ | $4.0 \times 10^7$ | $8.5 \times 10^7$ | $2.2 \times 10^7$ | $7.2 \times 10^8$ | $5.2 \times 10^8$ |
| 35° C/95% RH (H/H) | $1.8 \times 10^8$ | $2.0 \times 10^8$ | $6.2 \times 10^6$ | $2.1 \times 10^7$ | $5.3 \times 10^6$ | $3.1 \times 10^8$ | $1.2 \times 10^7$ |
| Variation figure: | 0.74 | 0.88 | 1.25 | 1.08 | 1.23 | 0.87 | 1.18 |
| L/L image evaluation: | B | B | A | B | A | B | B |
| H/H image evaluation: | A | A | B | A | B | A | A |

What is claimed is:

1. A conductive rubber roller comprising:

a conductive support; and a rubber layer;

wherein said rubber layer includes:

a component (A), an epichlorohydrin rubber containing 48 mol % or more of ethylene oxide; and a component (B), an acrylonitrile butadiene rubber having an acrylonitrile content of 20% by weight or less;

wherein said component (A) is present in a proportion in a range of 5 or more to less than 25 in weight ratio, based on a total weight of said components (A) and (B).

2. A conductive rubber roller according to claim 1, wherein said conductive rubber roller is a transfer roller.

3. A conductive rubber roller according to claim 1, wherein said acrylonitrile butadiene rubber has an acrylonitrile content of 18% by weight or less.

4. A conductive rubber roller according to claim 1, wherein said component (A) is present in a proportion in a range of 10 to 20 in weight ratio, based on the total weight of said components (A) and (B).

5. A conductive rubber roller according to claim 1, wherein said acrylonitrile butadiene rubber has an acrylonitrile content of 18% by weight or less, and wherein said component (A) is present in a proportion in a range of from 10 to 20 in weight ratio, based on the total weight of said components (A) and (B).

6. A conductive rubber roller according to claim 1, which has a resistance of $2\times10^8$ Ω or below.

7. A conductive rubber roller according to claim 1, which has a resistance of $2\times10^8$ Ω or above.

8. A conductive rubber roller according to claim 5, which has a resistance of $2\times10^8$ Ω or below.

9. A conductive rubber roller according to claim 5, which has a resistance of $1\times10^7$ Ω or above.

* * * * *

UNITED STATES PATENT AND TRADEMARK OFFICE

CERTIFICATE OF CORRECTION

PATENT NO. : 6,648,807 B2 Page 1 of 1
DATED : November 18, 2003
INVENTOR(S) : Masayuki Hashimoto et al.

It is certified that error appears in the above-identified patent and that said Letters Patent is hereby corrected as shown below:

Column 2,
Line 21, "epichioro-" should read -- epichloro- --.

Column 10,
Line 49, "$2 \times 10^8\ \Omega$" should read -- $1 \times 10^8\ \Omega$ --.

Signed and Sealed this

Sixth Day of July, 2004

JON W. DUDAS
*Acting Director of the United States Patent and Trademark Office*